United States Patent
Roach et al.

(10) Patent No.: US 9,422,048 B1
(45) Date of Patent: Aug. 23, 2016

(54) TENDON WEBBING TERMINATION PLATE FOR SUPERPRESSURE ENVELOPE

(71) Applicant: Google Inc., Mountain View, CA (US)

(72) Inventors: Kevin Roach, Boulder Creek, CA (US); Peter Isaac Capraro, San Francisco, CA (US); Jeffrey Neri, Gardnerville, NV (US); Kyle Brookes, Redwood City, CA (US)

(73) Assignee: Google Inc., Mountain View, CA (US)

( * ) Notice: Subject to any disclaimer, the term of this patent is extended or adjusted under 35 U.S.C. 154(b) by 126 days.

(21) Appl. No.: 14/283,900

(22) Filed: May 21, 2014

Related U.S. Application Data

(60) Provisional application No. 61/918,882, filed on Dec. 20, 2013, provisional application No. 61/918,894, filed on Dec. 20, 2013.

(51) Int. Cl.
*B64B 1/58* (2006.01)

(52) U.S. Cl.
CPC ...................... *B64B 1/58* (2013.01)

(58) Field of Classification Search
CPC ........... B64B 1/00; B64B 1/58; E04H 15/20; B63C 7/06; B63C 7/10; A63H 27/10
See application file for complete search history.

(56) References Cited

U.S. PATENT DOCUMENTS

| | | | | |
|---|---|---|---|---|
| 1,270,678 | A | | 6/1918 | Zavarkin |
| 2,679,224 | A | | 5/1954 | Sturtevant |
| 2,900,147 | A | * | 8/1959 | Huch ................ B64B 1/58 244/31 |
| 2,919,082 | A | | 12/1959 | Winzen et al. |
| 2,919,083 | A | * | 12/1959 | Suomi ............... B64B 1/58 244/31 |
| 3,608,510 | A | * | 9/1971 | De Vries .............. B63C 7/10 114/54 |
| 3,698,656 | A | * | 10/1972 | Ballenger .......... B65H 75/20 242/388.6 |
| 4,434,958 | A | | 3/1984 | Rougeron et al. |
| 4,478,012 | A | * | 10/1984 | Fraioli ............. E04H 15/20 52/2.25 |
| 4,705,235 | A | * | 11/1987 | Regipa ............... B64B 1/58 244/31 |
| 4,911,380 | A | * | 3/1990 | Regipa ............... B64B 1/58 24/459 |
| 4,986,494 | A | * | 1/1991 | Tockert ............. B64B 1/58 244/96 |
| 5,526,610 | A | * | 6/1996 | Delamare ........... E04H 15/20 52/2.18 |
| 6,394,388 | B2 | * | 5/2002 | Casteras ............ B64B 1/58 244/1 R |
| 6,783,093 | B2 | * | 8/2004 | Limber ............. B65H 75/14 206/420 |
| 2001/0005000 | A1 | * | 6/2001 | Christophe ......... B64B 1/58 244/31 |
| 2010/0258663 | A1 | * | 10/2010 | Limber ............. B65H 75/22 242/118.4 |

OTHER PUBLICATIONS

A. L. Morris. "Scientific Ballooning Handbook." NCAR Technical Note. Atmospheric Technology Division, National Center for Atmospheric Research. May 1975, 258 pages.
X. Deng. "Clefted Equilibrium Shapes of Superpressure Balloon Structures." California Institute of Technology, Pasadena, California. © 2012, 158 pages. Retrieved from: <http://thesis.library.caltech.edu/7141/>.

\* cited by examiner

*Primary Examiner* — Joseph W Sanderson
(74) *Attorney, Agent, or Firm* — Lerner, David, Littenberg, Krumholz & Mentlik, LLP

(57) ABSTRACT

An apparatus for securing a plurality of tendons to a balloon includes a first and second plate and a cable long enough to extend around a circumference of the first plate. The first plate has a plurality of slots and one more mating ports. Each slot is configured to allow a given tendon from the plurality of tendons to extend through the first plate by inserting a tendon within the slot. The second plate has a surface with one or more mating members attached. Each mating member is configured to connect the first and second plates together by mating with at least one of the one or more mating ports. The cable is configured to pass between the first and second plates so as to couple with each tendon within the plurality of slots in order to secure the tendons to a balloon structure.

20 Claims, 6 Drawing Sheets

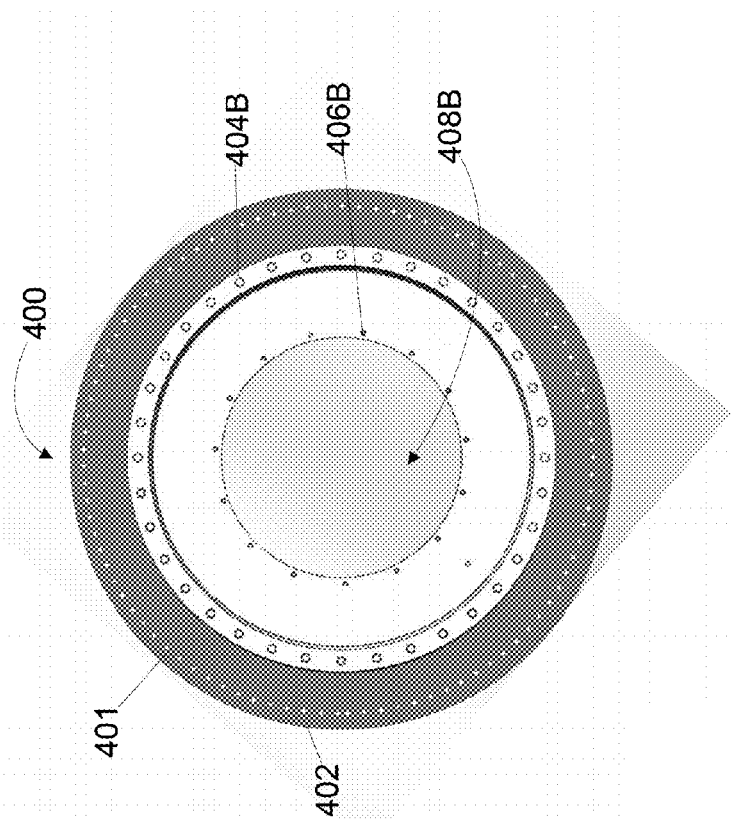
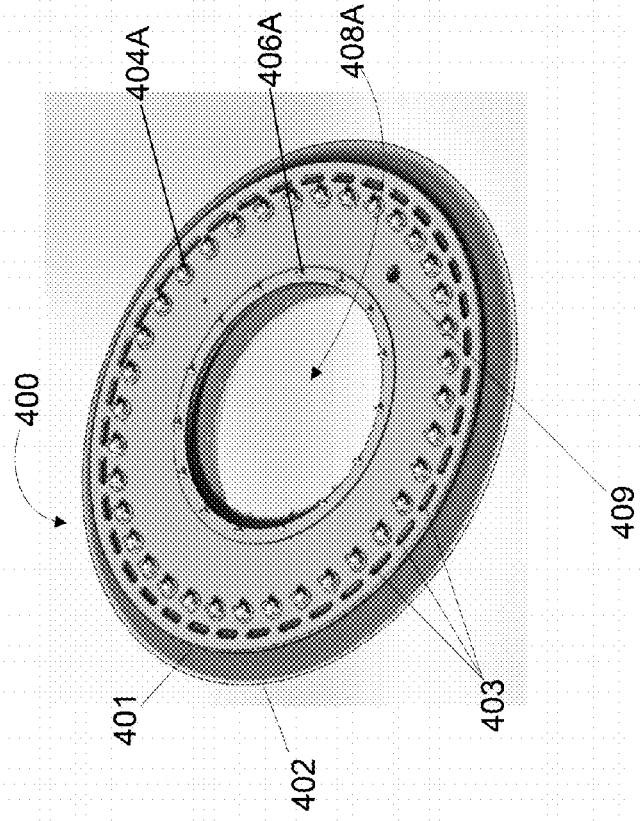
FIG. 4A
FIG. 4B

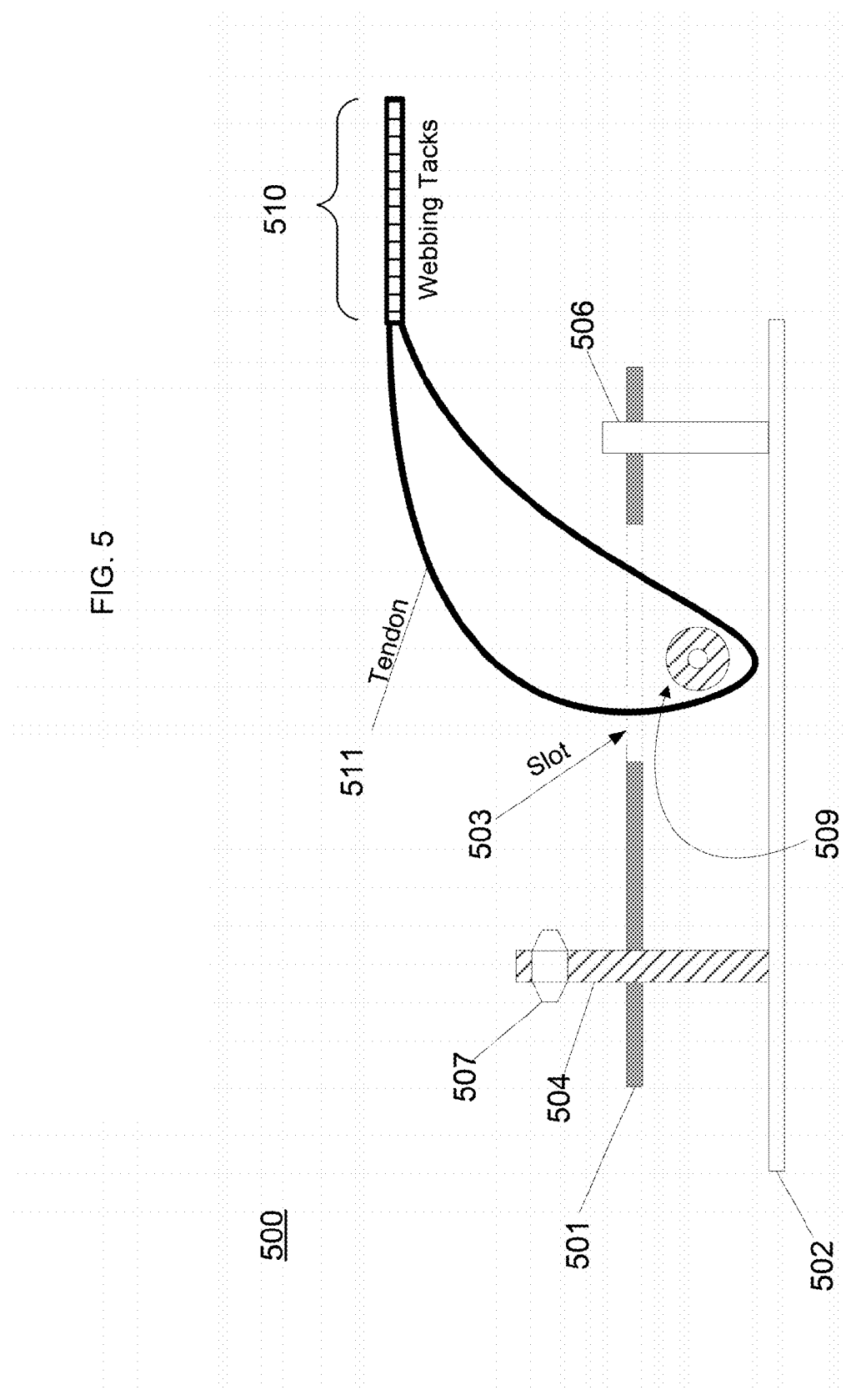

TENDON WEBBING TERMINATION PLATE FOR SUPERPRESSURE ENVELOPE

CROSS-REFERENCE TO RELATED APPLICATIONS

The present application claims the benefit of the filing date of U.S. Provisional Patent Application No. 61/918,882 filed Dec. 20, 2013 and claims the benefit of the filing date of U.S. Provisional Patent Application No. 61/918,894 filed Dec. 20, 2013, the disclosures of which are hereby incorporated herein by reference.

BACKGROUND

Computing devices such as personal computers, laptop computers, tablet computers, cellular phones, and countless types of Internet-capable devices are increasingly prevalent in numerous aspects of modem life. As such, the demand for data connectivity via the Internet, cellular data networks, and other such networks, is growing. However, there are many areas of the world where data connectivity is still unavailable, or if available, is unreliable and/or costly. Accordingly, additional network infrastructure is desirable.

Some systems may provide network access via a balloon network operating in the stratosphere. Because of the various forces experienced by these balloons during deployment and operation, there is a balancing of needs between flexibility and stability of materials. The balloons may be made of more flexible envelope material configured in sections or lobes to create a "pumpkin" or lobed balloon. The lobes may be supported by a plurality of tendons.

The tendons are used to bear some of the load caused by inflating the balloon envelope. These tendons also help maintain the shape of the envelope while the balloon is in flight. Typically, the tendons are ropes that can be attached to the balloons using bar tacks or specialized knots. However, using ropes with bar tacks can cause an overall drop in the tendons strength and tying these specialized knots can be an expensive and time-consuming process.

BRIEF SUMMARY

Aspects of the disclosure provide an apparatus for securing a plurality of tendons to a balloon. The apparatus includes a first plate that has a plurality of slots and one or more mating ports and a second plate that has a surface with one or more mating members attached to the surface. Each slot is configured to allow a given tendon from the plurality of tendons to extend through the first plate by inserting the given tendon within the slot. Each mating member is configured to mate with at least one of the one or more mating ports of the first plate in order to connect the first and second plates together. The apparatus also includes a cable that can extend around a circumference of the first plate. The cable is configured to pass between the first and second plates so as to be coupled to each tendon within the plurality of slots in order to secure the tendons to the balloon.

Another aspect of the disclosure provides a balloon system. The balloon system includes a plurality of tendons, a balloon that has a balloon envelope and an apparatus attached to an apex and a base of the balloon envelope. Each apparatus includes a first plate having a plurality of slots and one or more mating members and a second plate having a surface with one or more posts attached perpendicular to the surface. Each slot is configured to allow a given tendon from the plurality of tendons to extend through the first plate by inserting the given tendon within the slot. Each member is configured to mate with at least one of the one or more mating ports of the first plate in order to connect the first and second plates together. The apparatus also includes a cable that can extend around a circumference of the first plate. The cable is configured to pass between the first and second plates so as to be coupled to each tendon within the plurality of slots in order to secure the tendons to the balloon.

BRIEF DESCRIPTION OF THE DRAWINGS

FIG. 4A is an example of a termination assembly in accordance with aspects of the present disclosure.

FIG. 4B is another view of the termination assembly in FIG. 4A in accordance with aspects of the present disclosure.

FIG. 5 is a cross-sectional view of a termination assembly in accordance with aspects of the present disclosure.

DETAILED DESCRIPTION

Aspects, features and advantages of the disclosure will be appreciated when considered with reference to the following description of embodiments and accompanying figures. The same reference numbers in different drawings may identify the same or similar elements. Furthermore, the following description is not limiting; the scope of the present technology is defined by the appended claims and equivalents.

The present disclosure relates generally to providing a lightweight apparatus for quickly securing a plurality of load bearing tendons to a balloon. In one aspect, the apparatus includes a first plate and a second plate. The first plate has a plurality of slots and one or more mating ports. In this example, the slots are spaced on the first plate. Each slot is configured to allow a given tendon to extend through the first plate by inserting that tendon within the slot. As for the second plate, it has a surface with one or more mating members, for example, posts, attached to it. In this regard, the posts are configured perpendicular to the surface. Each post can mate with at least one of the one or more mating ports of the first plate in order to connect the first and second plates together. The assembly also includes a cable that is long enough to extend around a circumference of the first plate. This cable is configured to pass between the first and second plates. As the cable passes between the plates, it is coupled to each tendon within the plurality of slots so as to secure the tendons to the balloon.

EXAMPLE SYSTEM

Figure 1:
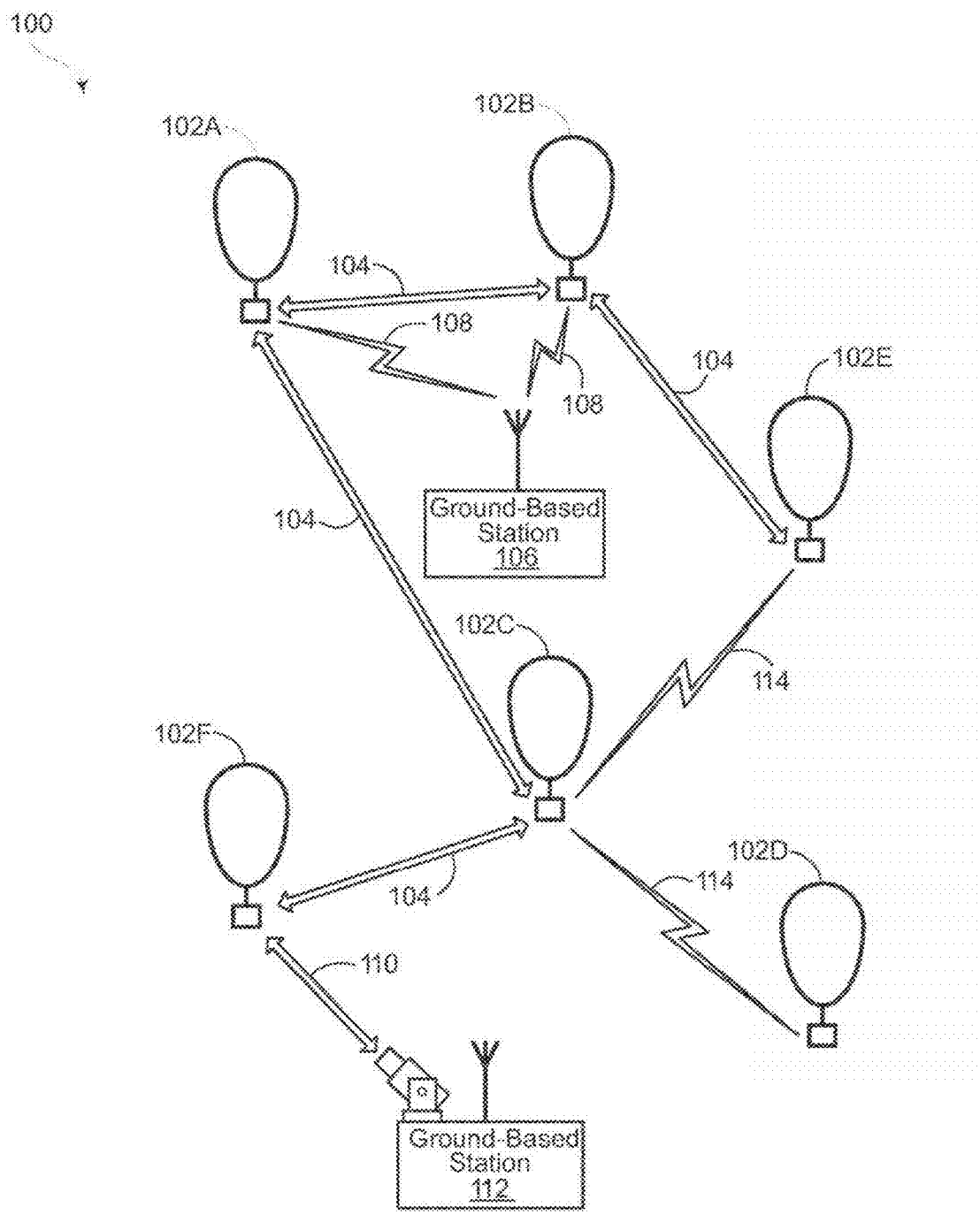
FIG. 1 is a functional diagram of a system in accordance with aspects of the present disclosure.

FIG. 1 depicts an example system 100 in which the balloons as described above may be used. This example should not be considered as limiting the scope of the disclosure or usefulness of the features described herein. System 100 may be considered a "balloon network." In this example, balloon network 100 includes a plurality of devices, such as of balloons 102A-F as well as ground base stations 106 and 112. Balloon network 100 may also include a plurality of additional devices, such as various computing devices (not shown) as discussed in more detail below.

As shown, the devices of system 100 are configured to communicate with one another. As an example, the balloons may include free-space optical links 104 and/or radiofrequency (RF) links 114 in order to facilitate intra-balloon communications. In this way, balloons 102A-F may collectively function as a mesh network for packet data communications. Further, at least some of balloons 102A-B may be configured for RF communications with ground-based stations 106 and 112 via respective RF links 108. Some balloons, such as balloon 102F, could be configured to communicate via optical link 110 with ground-based station 112.

As noted above, to transmit data to another balloon, a given balloon 102 may be configured to transmit an optical signal via an optical link 104. In addition, the given balloon 102 may use one or more high-power light-emitting diodes (LEDs) to transmit an optical signal. Alternatively, some or all of the balloons may include laser systems for free-space optical communications over the optical links 104. Other types of free-space optical communication are possible. Further, in order to receive an optical signal from another balloon via an optical link 104, a given balloon may include one or more optical receivers. Additional details of the balloons are discussed in greater detail below, with reference to FIG. 2.

Balloons in the network 100 may also utilize different RF air-interface protocols for communication with ground-based stations via respective RF links. For example, some or all of the balloons 102A-F may be configured to communicate with ground-based stations 106 and 112 via RF links 108 using various protocols described in IEEE 802.11 (including any of the IEEE 802.11 revisions), cellular protocols such as GSM, CDMA, UMTS, EV-DO, WiMAX, and/or LTE, and/or one or more propriety protocols developed for balloon-ground RF communication, among other possibilities.

In some examples, the RF links may not provide a desired link capacity for balloon-to-ground communications. For instance, increased capacity may be desirable to provide backhaul links from a ground-based gateway. Accordingly, an example network may also include downlink balloons, which could provide a high-capacity air-ground link between the various balloons of the network and the ground-base stations. For example, in balloon network 100, balloon 102F may be configured as a downlink balloon. Like other balloons in network 100, downlink balloon 102F may be operable for optical communication with other balloons via optical links 104. However, downlink balloon 102F may also be configured for free-space optical communication with ground-based station 112 via an optical link 110. Optical link 110 may therefore serve as a high-capacity link (as compared to an RF link 108) between the balloon network 100 and the ground-based station 112. Downlink balloon 102F may additionally be operable for RF communication with ground-based stations 106. In other cases, downlink balloon 102F may only use an optical link for balloon-to-ground communications. Further, while the arrangement shown in FIG. 1 includes just one downlink balloon 102F, an example balloon network can also include multiple downlink balloons. Alternatively, a balloon network can also be implemented without any downlink balloons.

A downlink balloon may be equipped with a specialized, high bandwidth RF communication system for balloon-to-ground communications, instead of, or in addition to, a free-space optical communication system. The high-bandwidth RF communication system may take the form of an ultra-wideband system, which may provide an RF link with substantially the same capacity as one of the optical links 104.

In a further aspect, some or all of balloons 102A-F could be configured to establish a communication link with space-based satellites in addition to, or as an alternative to, a ground based communication link. In some embodiments, a balloon may communicate with a satellite via an optical link. However, other types of satellite communications are possible.

The balloons 102A-F may collectively function as a mesh network. More specifically, since balloons 102A-F may communicate with one another using free-space optical links, the balloons may collectively function as a free-space optical mesh network. In a mesh-network configuration, each balloon may function as a node of the mesh network, which is operable to receive data directed to it and to route data to other balloons. As such, data may be routed from a source balloon to a destination balloon by determining an appropriate sequence of optical links between the source balloon and the destination balloon. These optical links may be collectively referred to as a "lightpath" for the connection between the source and destination balloons. Further, each of the optical links may be referred to as a "hop" on the lightpath.

The network topology may change as the balloons move relative to one another and/or relative to the ground. Accordingly, balloon network 100 may apply a mesh protocol to update the state of the network as the topology of the network changes. For example, to address the mobility of the balloons 102A to 102F, balloon network 100 may employ and/or adapt various techniques that are employed in mobile ad hoc networks (MANETs). Other examples are possible as well.

The balloon network may be configured as a "transparent" mesh network, as an "opaque" mesh network, or both. In a transparent balloon network, the balloons may include components for physical switching that is entirely optical, without any electrical components involved in the physical routing of optical signals. Thus, in a transparent configuration with optical switching the signals travel through a multi-hop light path that is entirely optical. In an opaque configuration, some or all of the balloons may use optical-electrical-optical (OEO) switching. For example, some or all balloons may include optical cross-connects (OXCs) for OEO conversion of optical signals.

Balloon network 100 may also implement station-keeping functions to help provide a desired network topology. For example, station keeping may involve each balloon 102 maintaining and/or moving into a certain position relative to one or more other balloons in the network (and possibly into a certain position relative to the ground). As part of this process, each balloon may implement station-keeping functions to determine its desired positioning within the desired topology, and if necessary, to determine how to move to the desired position.

The desired topology may vary depending upon the particular implementation and whether or not the balloons are continuously moving. In some cases, balloons may implement station keeping in order to provide a substantially uniform topology where the balloons function to position themselves at substantially the same distance (or within a certain range of distances) from adjacent balloons in the balloon network 100. Alternatively, balloon network 100 may have a non-uniform topology where balloons are distributed more or less densely in certain areas, for various reasons.

As an example, to help meet the higher bandwidth demands, balloons may be clustered more densely over areas with greater demand (such as urban areas) and less densely over areas with lesser demand (such as over large bodies of water). In addition, the topology of an example balloon network may be adaptable allowing balloons to adjust their respective positioning in accordance with a change in the desired topology of the network.

The balloons of balloon network 100 may be high-altitude balloons, which are deployed in the stratosphere. As an example, the balloons may generally be configured to operate at altitudes between 18 km and 25 km above the Earth's surface in order to limit the balloon's exposure to high winds and interference with commercial airline flights. In order for the balloons to provide a reliable mesh network in the stratosphere, where winds may affect the locations of the various balloons in an asymmetrical manner, the balloons may be configured to move latitudinally and/or longitudinally relative to one another by adjusting their respective altitudes, such that the wind carries the respective balloons to the respectively desired locations.

Figure 2:
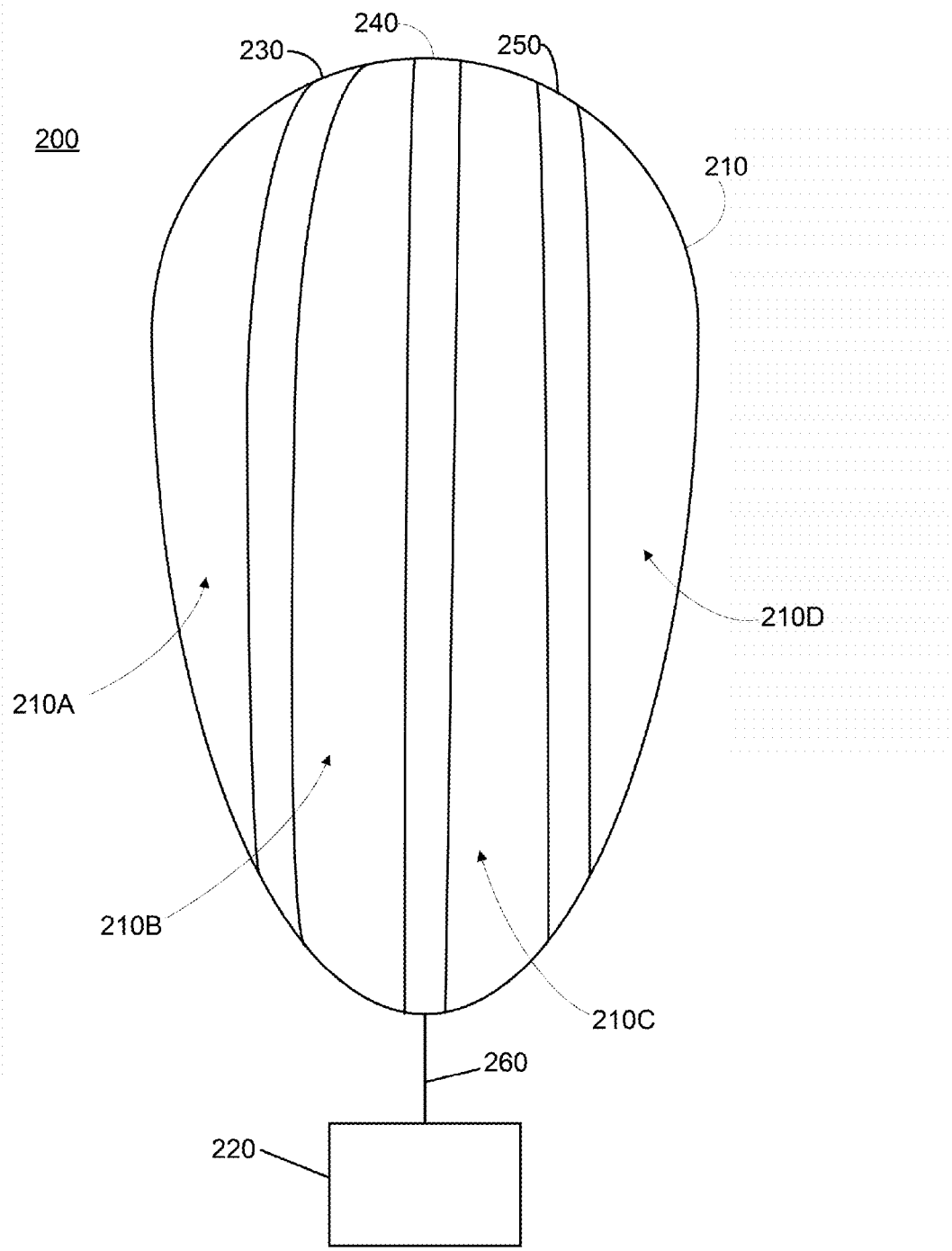
FIG. 2 is an example of a balloon in accordance with aspects of the present disclosure.

FIG. 2 is an example high-altitude balloon 200, which may represent any of the balloons of balloon network 100. The balloon 200 includes an envelope 210, a payload 220 and a plurality of tendons 230-250 attached to the envelope 210.

The high-altitude balloon envelope 210 may take various forms. In one instance, the balloon envelope 210 may be constructed from materials such as polyethylene that do not hold much load while the balloon 200 is floating in the air during flight. Additionally, or alternatively, some or all of envelope 210 may be constructed from a highly flexible latex material or rubber material such as chloroprene. Other materials are also possible. Further, the shape and size of the envelope 210 may vary depending upon the particular implementation. Additionally, the envelope 210 may be filled with various gases or mixtures thereof, such as helium, hydrogen or any other lighter-than-air gas. The envelope 210 is thus arranged to have an associated upward buoyancy force during deployment of the payload 220.

The payload 220 of balloon 200 is affixed to the envelope by a connection 260, such as a cable. The payload 220 may include a computer system (not shown), having one or more processors and on-board data storage. The payload 220 may also include various other types of equipment and systems (not shown) to provide a number of different functions. For example, the payload 220 may include an optical communication system, a navigation system, a positioning system, a lighting system, an altitude control system and a power supply to supply power to various components of balloon 200.

In view of the goal of making the balloon envelope 210 as lightweight as possible, it may be comprised of a plurality of envelope lobes or gores that have a thin film, such as polyethylene or polyethylene terephthalate, which is lightweight, yet has suitable strength properties for use as a balloon envelope deployable in the stratosphere. In this example, balloon envelope 210 is comprised of envelope gores 210A-210D.

The individual envelope gores 210A-210D may be shaped so that the length of the edge seam connecting adjacent envelope gores is greater than the length of a centerline of the envelope gores. Thus, the envelope gores 210A-210D may be shaped to better optimize the strain rate experienced by the balloon envelope 210. The pressurized lifting gas within the balloon envelope 210 may cause a force or load to be applied to the balloon envelope 210.

As noted above, the tendon structures 230-250 may be used to provide strength to the balloon envelope 210 to withstand the force or load created by the pressurized gas within the envelope. Each tendon may be formed as a fiber load tape that is adhered to a respective envelope gore. Alternately, a tubular sleeve may be adhered to the respective envelopes with the tendon positioned within the tubular sleeve.

In some aspects, the tendons 230-250 may be comprised of webbing. This webbing includes a plurality of fibers (not shown) woven together in a certain configuration. As noted above, incorporated by reference is U.S. Provisional Patent Application No. 61/918,894 filed Dec. 20, 2013, entitled "VARIABLE WEFT WEBBING FOR USE AS SUPER-PRESSURE ENVELOPE LOAD TENDON," which provides examples of different types of the tendons comprised of webbing. Alternatively, the tendons 230-250 do not have to be comprised of webbing instead the tendons can be other types of non-woven fibers.

The tendons 230-250 can run vertically from a base to an apex of the balloon envelope 210 in order to attach or otherwise secure them to an apparatus positioned at an either end of the envelope. By securing the tendons 230-250 to the apparatus, they will be able to support a load caused by inflating the envelope 210.

Figure 3:
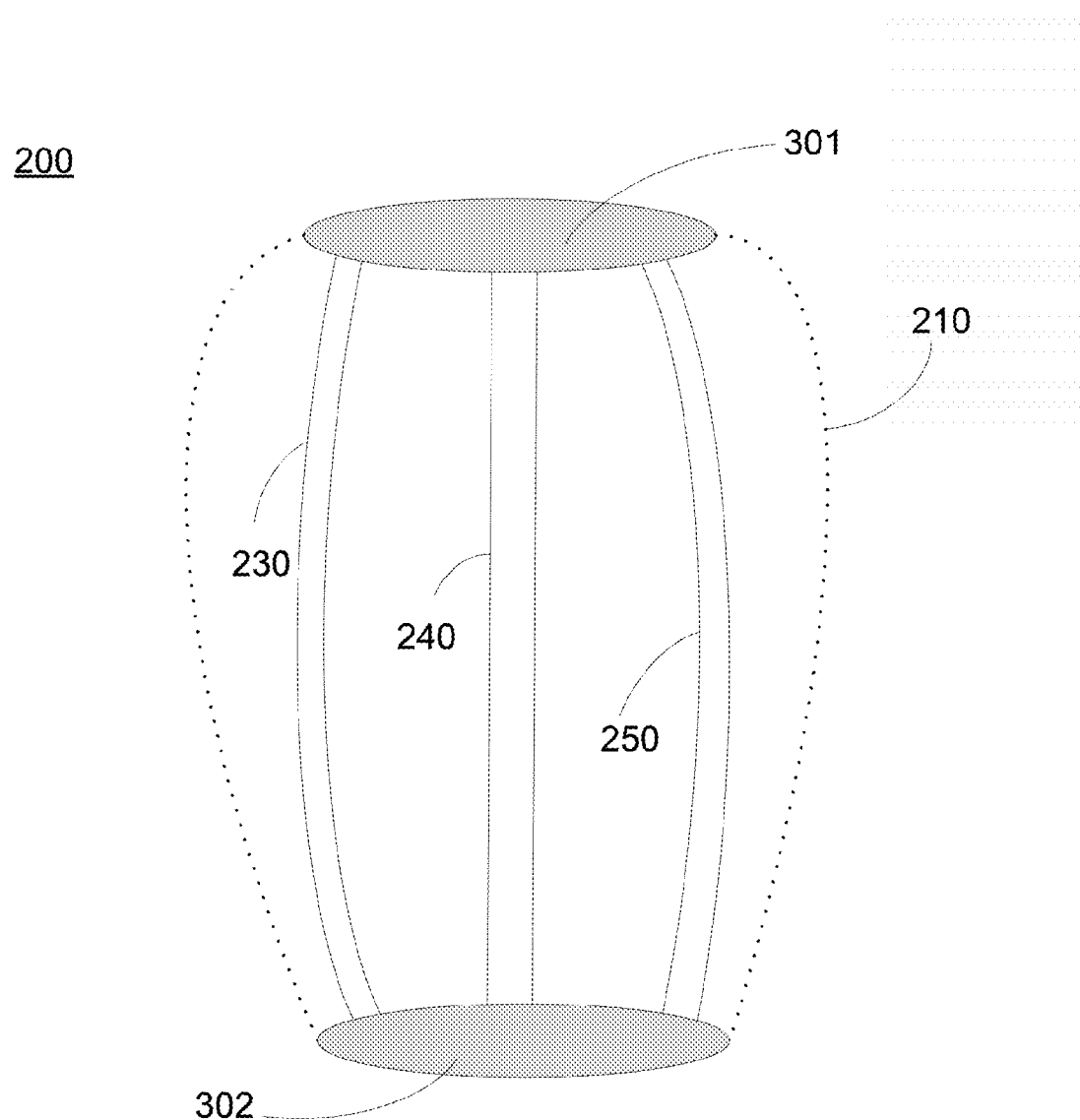
FIG. 3 is another view of the balloon in FIG. 2 in accordance with aspects of the present disclosure.

FIG. 3 is another view of the balloon 200 in FIG. 2. In this example, top ends of tendons 230, 240 and 250 are shown connected to one another. For instance, a type of apparatus, e.g., termination assembly 301, may be used to connect the top ends of each tendon. In some example, the termination assembly 301 may serve a mounting point for other components of the balloon 200, such as a parachute assembly used to safely bring the balloon back to earth in the event of a failure.

Top ends of the tendons 230, 240 and 250 may be coupled together using the termination assembly 301 positioned at the apex of balloon envelope 210. Bottom ends of the tendons 230, 240 and 250 may also be connected to one another. For example, a corresponding apparatus, e.g., termination assembly 302, is disposed at a base or bottom of the balloon envelope 210. As shown in FIG. 2, the tendons 230, 240 and 250 are coupled to this assembly 302 so that they can be securely attached to the base of the balloon envelope 210. The termination assembly 302 at the base may be the same size and shape as the assembly 301 at the top. Both assemblies include corresponding components for attaching the tendons 230, 240 and 250. Examples these components are further described below.

FIGS. 4A-B depicts different views of termination assembly 400. With reference to FIG. 4A, an example of the termination assembly 400 is shown. In this example, the termination assembly 400 includes two plates secured together. For example, the termination assembly 400 includes a first plate 401 secured to a second plate 402. Each plate has a lightweight but rigid structure that may be comprised of, for example, metal. In some embodiments, the plates can be a metal with a low coefficient of thermal expansion (CTE) like aluminum or other kinds of alloys.

As shown, the termination assembly includes a plurality of slots or termination points 403 for receiving ends of tendons. One or more mating arrangements 404A and 406A are provided that may assist in securing the two plates together. In some embodiments, the one or more of the mating arrangements 404A and 406A can also be used to secure a portion of the balloon envelope the termination assembly. An access port 408A, e.g., a cavity, is also provided for accessing a portion of the plates. In some embodiments, the termination assembly can also include one or more additional openings, such as opening 409, which can be used to attach other components to the balloon, such as a air pump for inflating the balloon envelope.

As shown in FIG. 4A, the slots 403 are spaced on the first plate 401 along its circumference. As a result, a diameter for the plate 401 may be based on a length of each slot and how many of the slots are in the plate. For example, each slot 403 is positioned lengthwise and adjacent to another slot, which taken together are arranged in a circular pattern. Thus, the first plate's minimum diameter may be of a certain length in order to include the circumference of the circle formed by this arrangement of slots.

Each slot is configured to receive a tendon that will be secured to the termination assembly 400. The tendons provide strength so that the balloon's envelope can withstand a load created by inflating it with pressurized gas. The slots 403 are configured to include an opening that receives an end of the tendon, thereby allowing the tendon to pass through the first plate 401. For that purpose, the opening will correspond to a width of the tendon so that it can be inserted into the respective slot 403. Accordingly, the tendons that are used with the termination assembly 400 are preferably all of a corresponding width.

Each mating arrangement 404A and 406A may include several other components, such a mating member, a mating port and a fastener. These components may be attached to the first and second plates 401 and 402 or some combination thereof. In this example, a part of the mating arrangement is disposed on the first plate 401. For example, each set of mating arrangements 404A and 406A may include a number of mating ports or openings (not shown). In some aspects, the mating ports may be configured around the access port 408A of the first plate 401 or in various other configurations. The mating ports may be configured to receive a corresponding mating member 404B and 406B disposed the second plate 402.

Turing to in FIG. 4B, the mating members 404B and 406B are configured in this example as posts that extend perpendicularly from a surface of the plate. These posts may be of the same material used to form the plates, or they may be of a different material. The mating members 404B (e.g., posts) on the second plate 402 correspond to the mating ports (e.g., openings) in set 404A on the first plate 401. Similarly, a different set of mating members 406B on the second plate 402 correspond with the mating ports in set 406A of the first plate 401. Each paired set of mating members and ports (e.g., post and openings) are uniformly spaced in a corresponding pattern on their respective plates. For example, here, both are configured in a circular pattern. For mating purposes, an advantage of this uniform spacing is that it allows the mating members 404B and 406B to easily line up with the mating ports 404A and 404B.

In some embodiments, the mating members 404B and 406B can be threaded and non-threaded mating members or some combination thereof. When the posts are threaded, they can receive a fastener, such as nut or bolt. By using the fastener, the first plate 401 and the second plate 402 are secured together. For example, when the plates are fitted jointly, the mating members 404B and 406B of the second plate 402 protrude through the first plate 401. Then, a fastener may be placed on the threaded members and tightened, for example, using a twisting motion, in order to secure the plates together.

Depending on where the termination assembly 400 is positioned, component 408B on second plate 402 may be at an apex or base of the balloon envelope. As noted above, corresponding termination assemblies are at the apex and/or base of the balloon envelope. If termination assembly 400 is at the base of the balloon envelope, the component 408B may include an opening that allows access to the inside of the balloon envelope. If the termination assembly 400 is at the apex, the component 408B may not include this opening. For example, it may be closed in order to serve as a cap for the balloon.

The termination assembly 400 may not itself be load bearing. In such cases, the termination assembly 400 may include a load bearing mechanism for supporting the tendons attached to it. For example, the termination assembly 400 may include a cable that can be coupled to each tendon in order to secure that tendon to the assembly. In some aspects, the load bearing mechanism can be a forged ring or another type of mechanism strong enough to support the load carried by the tendons. This mechanism may be configured to reach around the termination assembly 400 in a manner so that it can be coupled each tendon inserted in a given slot of the first plate 401.

FIG. 5 is a cross-sectional view of a termination assembly 500 for use in accordance with aspects of this disclosure. In this example, the termination assembly 500 includes a first plate 501 and a second plate 502 where a plurality of slots, such as slot 503, are disposed on the first plate 501 and a number of mating members, such as member 504 and 506, are disposed on the second plate 502. When mating the plates together, the mating members 504 and 506 of the second plate 502 may pass through a corresponding mating port or opening (not shown) located on the first plate 501.

As discussed above, the mating members can be threaded and/or non-threaded members. For example, member 504 may include a number of threads, while member 506 does not. The threaded members are used to tightly join the two plates. For example, threaded member 504 can be fitted with fastener 507 (e.g., a type of screw nut), which can be tightened so as to secure the plates together.

The slots on the first plate 501 are used as placeholders for the tendons that are to be attached to the termination assembly 400. As shown in FIG. 5, tendon 511 can pass through the first plate 501 by being inserted into slot 503. In some aspects, the tendon 511 is comprised of webbing that includes a plurality of fibers woven together. Alternatively, the tendons may not be comprised of webbing, but rather they can be comprised of other types of non-woven fibers.

Each end of the tendon can be easily formed into a shape capable of fitting within the slots. For example, an end of tendon 511 is configured to form a loop that is capable of being inserted into slot 503. In this regard, an advantage of using webbing for the tendons is that it can be quickly and cheaply terminated by a series of webbing tacks 510 that are aligned across the width of tendon 511. The tacks 510 help the webbing to keep its loop shape.

As shown in FIG. 5, the created loop can be fed through slot 503 of the first plate 501. A load bearing mechanism may be used to secure the tendon 511 in the slot 503. In this example, a steel cable 509 is used as the load bearing mechanism. This cable 509 is configured to fit between the first and second plates 501 and 502 of the terminal assembly 500. The cable 509 is run through the loop of tendon 511 then fed around a circumference of the terminal assembly 500.

Figure 6:
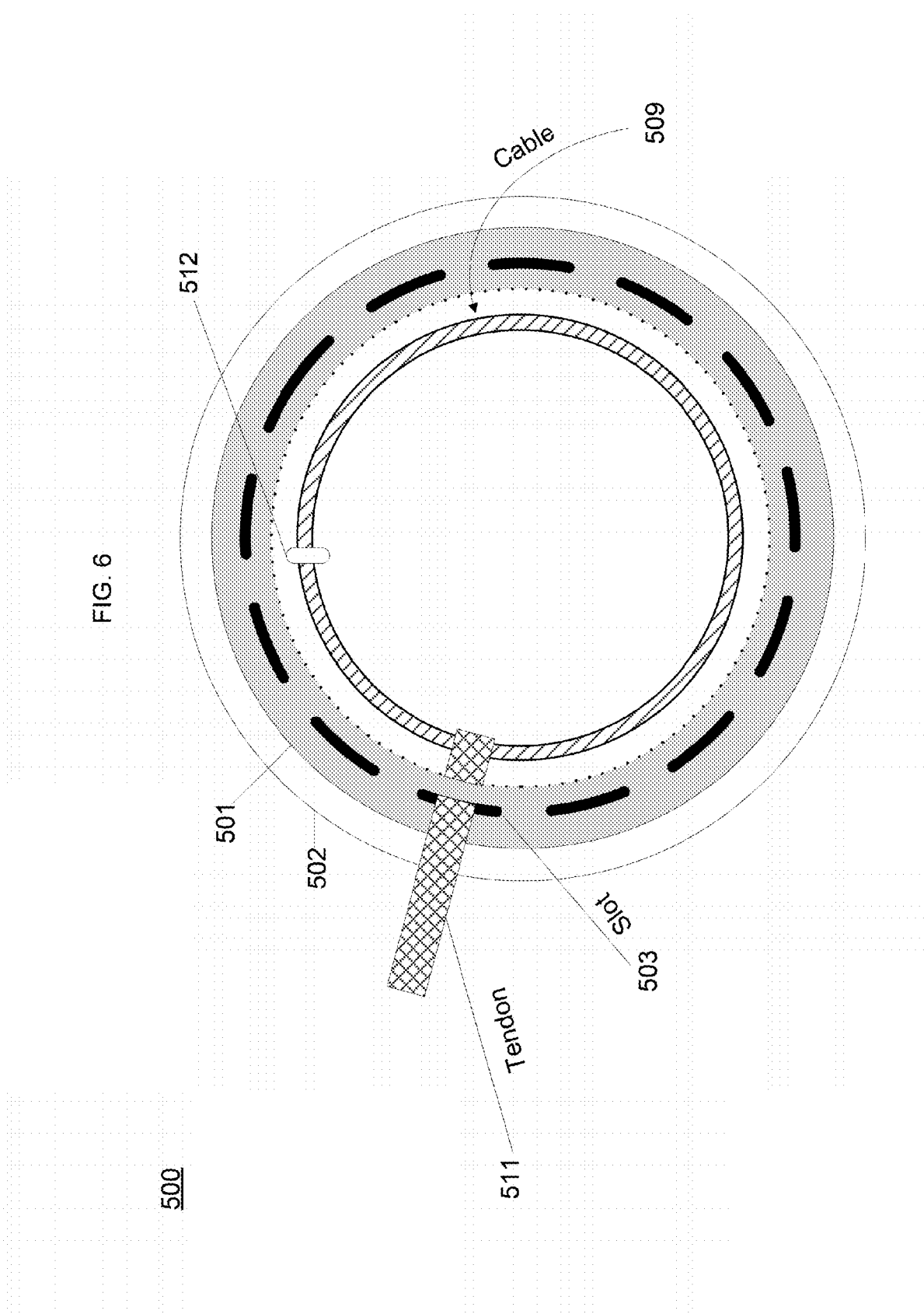
FIG. 6 is another view of the termination assembly in FIG. 5 in accordance with aspects of the present disclosure.

In FIG. 6, another view of the termination assembly 500 in FIG. 5 is shown. Here, a full view of the circumference of the termination assembly 500 is depicted. As shown, cable 509 can be coupled to tendon 511, which is inserted into slot 503. For example, the cable 509 may be coupled to the tendon 511 by feeding it through a loop at an end of the tendon 511. As noted above, the cable 509 is then fed around a circumference of the terminal assembly 500. As the cable 509 passes each slot along a circumference of the first plate 501, it runs through the loop of the tendon inserted into that slot. After cable 509 passes all the way around the terminal assembly 500, it may be clamped onto itself using, for example, a type of self-locking device 512. In some examples, this locking device 512 may not be part of the cable, but rather it may be engaged after the cable 509 is feed through the termination assembly 510. Once the locking device 512 is engaged, the tendons inserted into the various slots are thus secured to the terminal assembly 500.

Most of the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. As an example, the preceding operations do not have to be performed in the precise order described above. Rather, various steps can be handled in a different order or simultaneously. Steps can also be omitted unless otherwise stated. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A balloon system, comprising:
   a plurality of tendons;
   a balloon having a balloon envelope; and
   an apparatus attached to the balloon envelope, the apparatus comprising:
   a first plate having a first top surface and a first bottom surface opposite of the first top surface, the first plate also having a plurality of slots extending through the first plate from the first top surface to the first bottom surface;
   a second plate having a second top surface and a second bottom surface opposite of the second top surface, the second top surface being oriented towards the first bottom surface, and the second plate being secured to the first plate so as to create an area between the second top surface and the first bottom surface, and wherein each slot of the plurality of slots is configured to allow a respective tendon of the plurality of tendons to extend through a respective one of the plurality of slots and into the area; and
   a cable being configured to pass within the area order to allow the cable to be coupled to the tendons within the area, the cable being further configured to secure each respective tendon of the plurality of tendons to the respective one of the plurality of slots.

2. The balloon system of claim 1, further comprising one or more ports disposed on the first plate and one or more members attached to the second plate, each member mating with at least one of the one or more ports of the first plate in order to secure the first and second plates together.

3. The balloon system of claim 2, wherein the members are posts that extend perpendicularly with respect to the second top surface and the ports are openings that accept the posts.

4. The balloon system of claim 1, wherein each tendon of the plurality of tendons is comprised of webbing.

5. The balloon system of claim 4, wherein an end of each tendon of the plurality of tendons forms a loop insertable into a given slot of the plurality of slots.

6. The balloon system of claim 5, wherein each loop of each given tendon of the plurality of tendons is fastened to the given tendon by a number of webbing tacks.

7. The balloon system of claim 6, wherein the cable is arranged through the loop of each given tendon.

8. The balloon system of claim 1, wherein the slots are arranged around the circumference of the first plate.

9. The balloon system of claim 1, wherein the cable is a load bearing cable.

10. The balloon system of claim 1, further comprising a locking mechanism attached to the cable, the locking mechanism having an engaged state where the locking mechanism is configured to secure the plurality of tendons to the balloon.

11. The balloon system of claim 1, wherein the cable is arranged to form a loop in the area.

12. The balloon system of claim 11, further comprising a locking device for locking the cable into the loop.

13. The balloon system of claim 11, wherein the locking device is configured to lock the cable into the loop when the cable is fed through a loop at an end of each tendon of the plurality of tendons.

14. The balloon system of claim 1, wherein the cable is configured to secure each respective tendon of the plurality of tendons by preventing each respective tendon of the plurality of tendons from passing through the respective one of the plurality of slots.

15. The balloon system of claim 1, wherein an end of each tendon of the plurality of tendons forms a loop, and each loop of the plurality of tendons is inserted into a given slot of the plurality of slots.

16. The balloon system of claim 15, wherein the cable is arranged through the loop of each given tendon within the area.

17. The balloon system of claim 1, wherein the second plate is arranged at an apex of the balloon envelope.

18. The balloon system of claim 1, wherein the second plate is arranged at a base of the balloon envelope.

19. The balloon system of claim 18, wherein the first or second plates include an opening that allows access to the inside of the balloon envelope.

20. The balloon system of claim 3, wherein the posts are threaded in order to receive a respective fastener configured to secure the first plate and the second plate.

* * * * *